Sept. 22, 1936. J. W. LOGAN, JR 2,055,460
FLUID PRESSURE BRAKE
Filed Jan. 16, 1936 4 Sheets-Sheet 2

BRAKE UNIT NO. 3

BRAKE UNIT NO. 4

TRAIN SECTION NO. 2

INVENTOR
JOHN W. LOGAN, JR.
BY
ATTORNEY

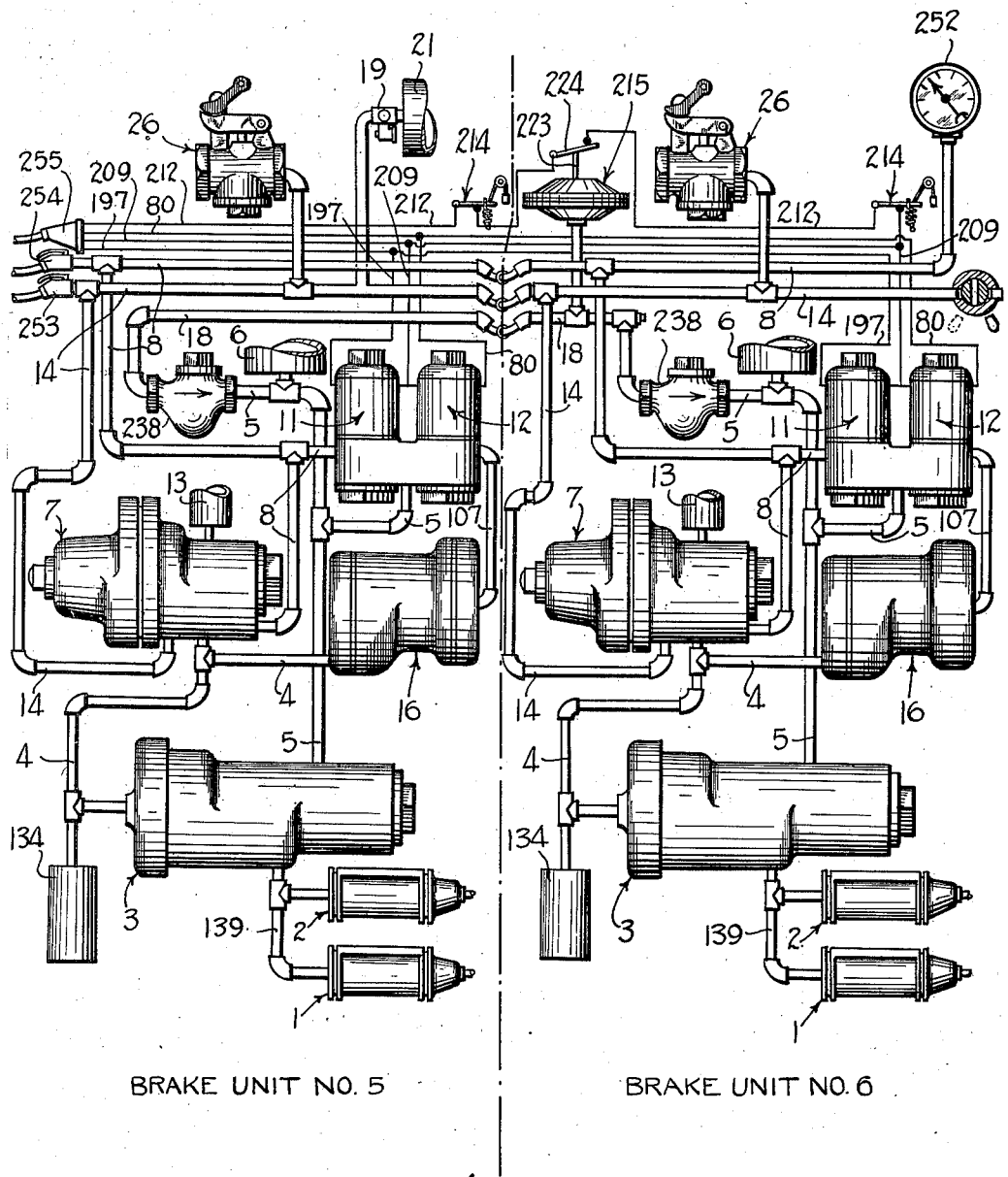

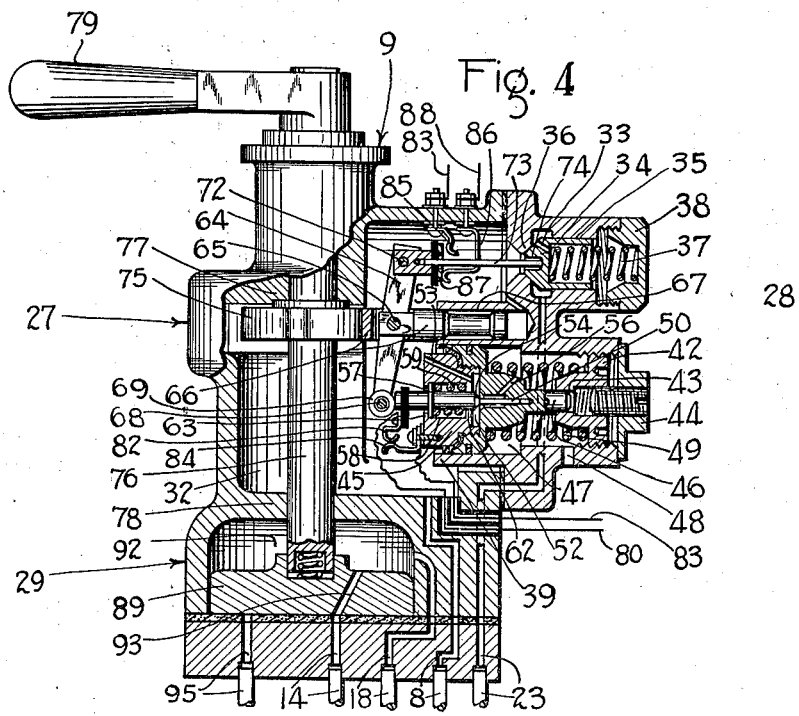
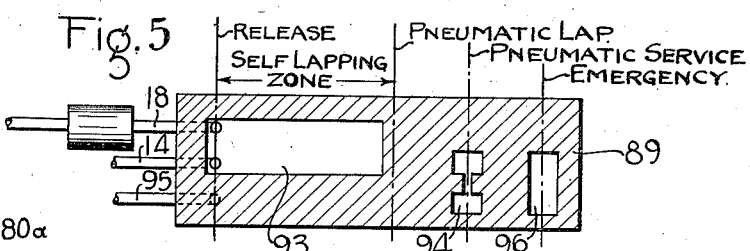

Patented Sept. 22, 1936

2,055,460

UNITED STATES PATENT OFFICE 2,055,460

FLUID PRESSURE BRAKE

John W. Logan, Jr., Forest Hills, Pa., assignor to The Westinghouse Air Brake Company, Wilmerding, Pa., a corporation of Pennsylvania Application January 16, 1936, Serial No. 59,394

13 Claims. (Cl. 303—24)

My invention relates to brake systems for vehicles, and more particularly to a brake system intended for use on high speed trains.

It is customary in brake systems for high speed trains, to provide an automatic brake portion whereby the brakes may be applied in accordance with a reduction in brake pipe pressure, and a straight air portion for normal service applications of the brakes, which gives a greater flexibility of control than does the automatic portion, the automatic portion being generally held in reserve as an auxiliary brake for use upon failure of the straight air portion. It is also customary in such brake systems for high speed trains, to provide magnet valve devices associated with the several braking units for controlling straight air pipe pressure and a retardation controller responsive to the rate of retardation of the vehicle for controlling said magnet valve devices to limit the rate of retardation of the vehicle to some predetermined or desired maximum value when the brakes are under the control of the straight air pipe.

It is an object of my invention to provide, in a brake system of the class described, a service portion in which the degree of application of the brakes of the several braking units is controlled by the pressure in a straight air pipe, common to all brake units, and provided both with magnet valve devices and with a self-lapping brake valve device for controlling the straight air pipe pressure.

It is another object of my invention to provide, in a brake system of the class described, an automatic brake portion having an automatic valve controlled by a brake pipe extending through the train, and provided with a retardation controller that is effective to control brake cylinder pressure to limit the rate of retardation of the vehicle independently of whether the brakes are under the control of the straight air portion or the automatic portion.

It is a further object of my invention to provide a brake system of the character described in which the brakes may be controlled by the straight air portion in the event of failure of operation of the magnet valve devices such as may result either upon interruption of the circuit to the magnet valve devices or upon complete loss of battery power.

Another object of my invention is the application of a brake system of the character above indicated to the operation of a multiple unit train, made up of a plurality of train units or sections, one or more of which may be divided from the main train for branch line service.

It is a further object of my invention to provide, in a brake system of the class indicated, a signal system, the signal circuit of which serves also as a check circuit to indicate that the jumper cables of the magnet valve circuit are connected between the several train units throughout the length of the train.

Other objects and advantages of my invention will be apparent from the following description of one preferred embodiment of the invention, reference being had to the accompanying drawings in which Figs. 1, 2 and 3 taken together are a diagrammatic view illustrating a preferred embodiment of the invention for use on multiple unit trains.

Fig. 4 is a sectional view of the brake valve device shown in Figs. 1 and 2,

Fig. 5 is a diagrammatic development showing the operation of the rotary valve in Fig. 4, Figs. 6 and 7 are diagrammatic views of the transfer device shown in Fig. 2 for determining whether the brake equipment on an intermediate section of the train shall be under the control of the brake valve device in that section, or in another section of the train.

Figure 1:
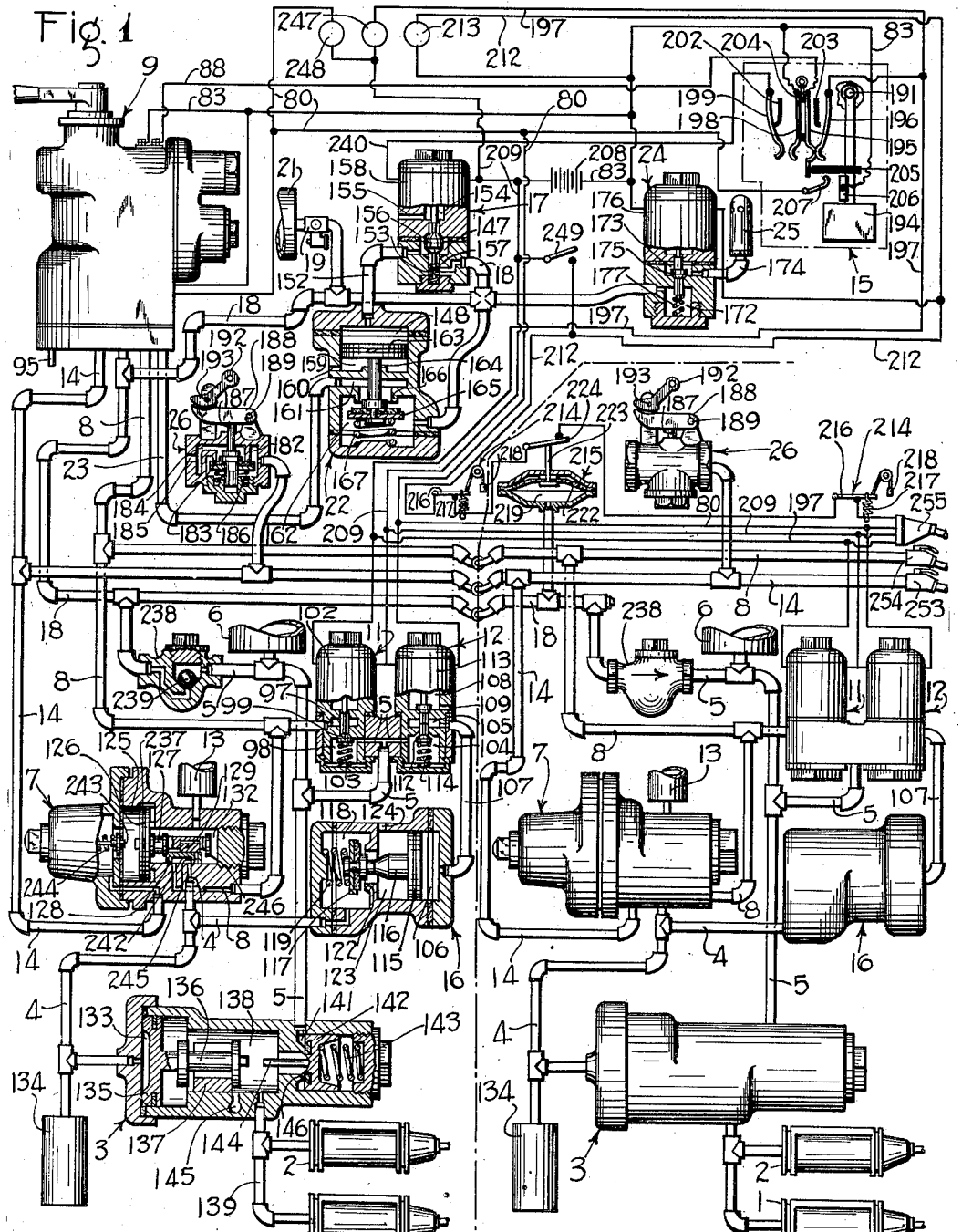
Figure 2:
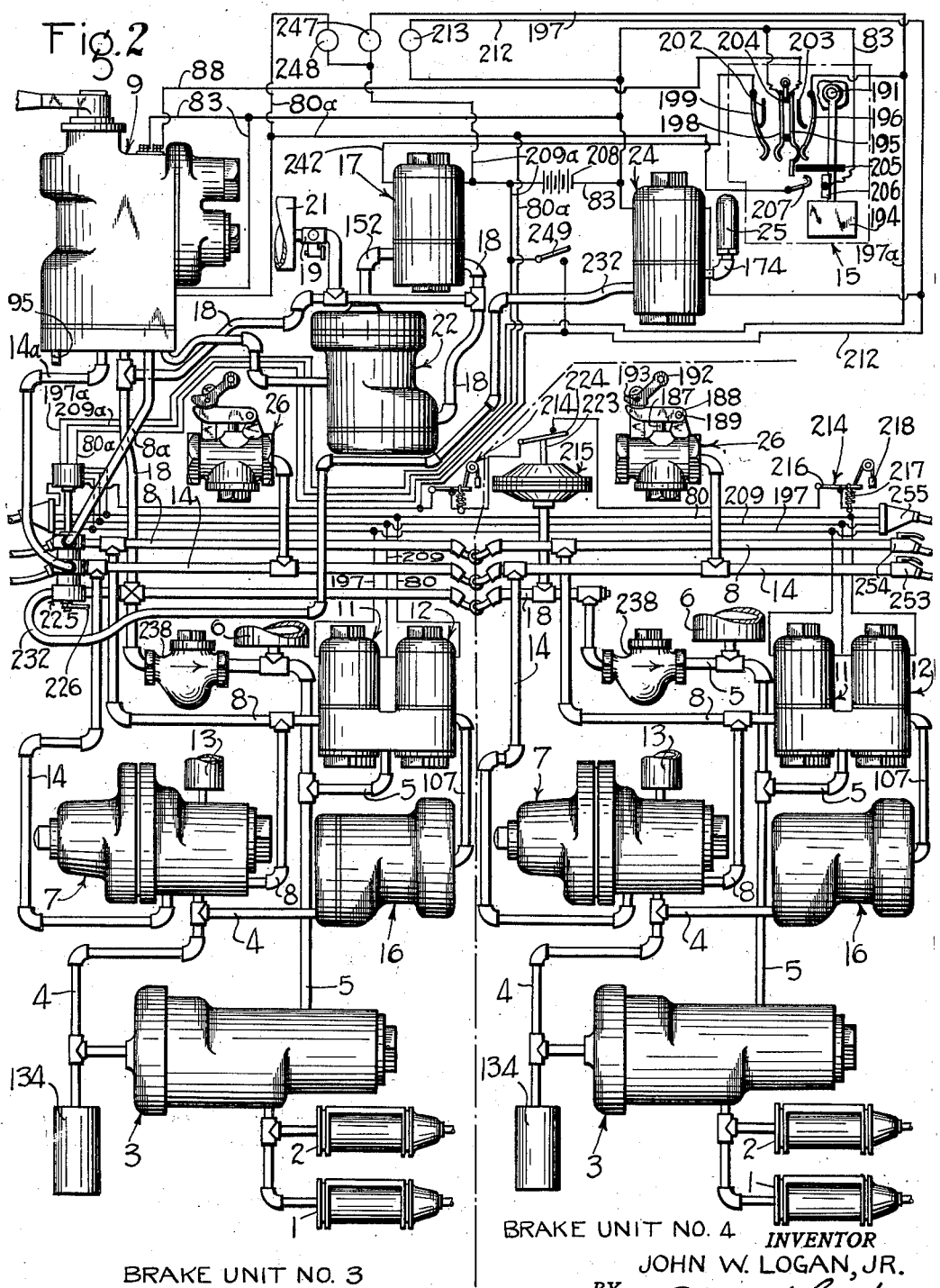

Figs. 1, 2 and 3 taken together illustrate a multiple unit train having three units or sections, one represented in each of the three figures, each train section comprising two brake units indicated as two cars. Each of the train units or sections is provided with its own compressor and main reservoir to provide a source of fluid under pressure for charging the equipment of each section independently of the other sections. Any number of intermediate train units or sections may be employed having transfer equipment thereon for connecting the brake equipment on that unit either to the main magnet valve device circuits extending from the brake valve device at the front of the train and connecting the straight air pipe and the brake pipe of that section to the corresponding pipe of the adjoining section so that the entire equipment may be controlled from the brake valve device at the front of the train, or for transferring the connection of these several devices to the brake valve device on the intermediate section when it is operated as an individual train unit.

Referring to Figs. 1, 2 and 3, the equipment illustrated therein comprises brake cylinders 1 and 2 for each brake unit for applying the fluid pressure brakes in accordance with the operation of a relay valve device 3 as controlled by the pressure in a control pipe 4 for supplying fluid under pressure to the brake cylinder from the supply reservoir 6 through supply reservoir pipe 5.

Fluid under pressure is supplied to the control pipe 4 through the automatic valve device 7 either from the straight air pipe 8 as controlled by the brake valve device 9 and the application magnet valve device 11, or from the auxiliary reservoir 13 upon operation of the automatic valve device 7 upon a reduction in pressure in the brake pipe 14 as controlled by the brake valve device 9. The application magnet valve device 11 and the release magnet valve device 12 are controlled both by the brake valve device 9 and by the retardation controller device 15 for effecting the supply of fluid under pressure to, and the release of fluid under pressure from, the straight air pipe 8. The release magnet valve device 12 controls a release relay valve device 16 for effecting the release of fluid under pressure from the control pipe 4.

A cut-off magnet valve device 17 is provided for controlling the flow of fluid under pressure from the main reservoir pipe 18 as supplied thereto by the feed valve device 19 from the main reservoir 21, to a supply relay valve device 22 and the supply pipe 23 to the brake valve device 9.

A signal magnet valve device 24 and a whistle 25 are provided for signaling the operator from the rear, or any portion, of the train. A conductor's valve 26 may be provided on each car or braking unit of the train for effecting automatic application of the brakes independently of the operator.

The brake valve device 9, best shown in Fig. 4, comprises a casing having a main body portion 27, a self-lapping valve portion 28, and a rotary valve portion 29, the three portions together defining a pressure chamber 32 that is in constant open communication with the straight air passage and pipe 8.

The self-lapping valve portion 28 is provided with a supply valve chamber 33 to which, when the relay valve device 22 is in its normal or illustrated position, fluid under pressure is supplied from the main reservoir 21 through the main reservoir pipe 18, the relay valve device 22, and the supply pipe and passage 23. A supply valve 34 is contained within the supply valve chamber 33 and is slidably disposed within a bore 35 in the casing to engage a seat 36 provided in the valve portion of the casing. The supply valve 34 is subject to the pressure of a spring 37, one end of which engages the valve and the other end of which engages a nut 38 that is screw-threadedly attached within a bore in the valve portion of the casing.

The self-lapping valve portion or section of the casing 28 is also provided with a cylinder 39, the outer end of the cylinder being closed by an adjusting member 42 screw-threadedly attached within a bore in the self-lapping valve casing portion. The adjusting member 42 is provided with a central bore 43 which at its outer end is adapted to receive a screw-threaded cap member 44.

Operatively mounted in the cylinder 39 adjacent the open end is a movable abutment in the form of a piston 45 having a stem 46 which is slidably guided by the adjusting member 42 within the inner end of the bore 43. At one end of the piston 45 is a chamber 47 which is constantly open to the atmosphere through the exhaust port 48. A coil spring 49 is contained in the chamber 47 and is interposed between and engages the inner face of the piston 45 and the inner face of the adjusting member 42.

A release valve chamber 52 is provided within the piston 45 that is in open communication with the pressure chamber 32 through a passage 53. A release valve 54 is contained within the valve chamber 52 and is adapted to seat on the valve seat 55 formed on the piston and which is operated to control communication between the valve chamber 52 and the chamber 47 through connecting passages 56 in the piston stem 46. The release valve is provided with a stem 50, the small end of which slides within a bore in the stem of the piston 45 and the larger end of which is provided with a collar 57 which slidably engages the piston within a central bore 58 and is subject to the pressure of the release valve spring 59 interposed between and engaging the collar 57 and the annular flange 62 on the piston. Outward movement of the release valve relative to the piston 45 is limited by the collar 57 which engages the stop flange 63 that is secured to the piston 45.

A mechanism is provided for controlling the operation of the supply valve 34 and the release valve 54 comprising spaced levers 64 that are pivotally mounted intermediate their ends on a pin 65 supported in a plunger 66 that is slidably guided within a bore 67 in a casing of the self-lapping valve portion 28.

The lower ends of the spaced levers 64 are connected together by a pin 68 which is loosely mounted within a roller 69 that is adapted to operatively engage the outer end of the release valve stem 50. The upper end of the spaced levers 64 are connected together by a pin 72 on which one end of an operating rod 73 is pivotally mounted, the opposite end of the rod operatively engaging the supply valve 34 within a recess 74 formed in its face.

For the purpose of operating the plunger 66 toward the right there is provided an operating cam 75 mounted upon a shaft 76 that is carried in an upper bearing 77 and in a lower bearing 78 and is arranged to be operated by a brake valve handle 79. As the handle 79 is moved progressively from its release position toward full service application position, the cam 75 forces the plunger 66 progressively toward the right.

It will be appreciated that the force of the release valve spring 59 is less than the force of the supply valve spring 37, which is less than the force of the regulating spring 49. When the cam 75 and the plunger 66 are in their release position as shown in Fig. 4, the spring 37 forces the supply valve 34 toward the left to its seated position and the spring 59 forces the release valve 54 toward the left toward its unseated position.

For the purpose of controlling the application and release of the brakes through the application magnet valve device 11 and the release magnet valve device 12 associated with each brake unit of the train simultaneously with like operation of the brakes through operation of the supply valve 34 and the release valve 54, respectively, contact members are provided in the brake valve device for controlling circuits to the magnet valve devices in accordance with the movement of the supply and release valve, respectively, of the brake valve device. The contact member 82 is mounted on the release valve stem 50 and is adapted to engage a contact member 84, mounted on the movable abutment 45, when the release valve 54 is unseated or in its illustrated position, to close a circuit from a conductor 83 leading from a source of electrical energy to the release magnet valve conductor 80. The contact member 82 is moved from engagement with the contact member 84 to interrupt this circuit upon movement of the release valve 54 to its seat. Contact members 85 and 86 are mounted in the upper portion of the casing structure of the brake valve device and are adapted to be bridged by a contact member 87 carried by the supply valve operating rod 73 when this rod is moved toward the right to force the supply valve 34 from its seat. Engagement of the contact members 85 and 86 by the contact members 87 closes a circuit from a source of energy through the conductor 83 to the application magnet valve conductor 88 leading to the several application magnet valve devices 11 throughout the train.

To the lower end of the shaft 76, below the bearing 78, a rotary valve 89 is attached within the valve chamber 92 that is in constant communication with the main reservoir 21 through main reservoir passage and pipe 18 and feed valve device 19. When the brake valve handle 79 is in any position within the self-lapping zone the rotary valve chamber 92 is also in communication with brake passage and pipe 14.

When the rotary valve 89 and the handle 79 of the brake valve device are moved to pneumatic service application position, the brake pipe and passage 14 are connected to the exhaust port 95 through a cavity 94 in the rotary valve 89 as shown in Fig. 5. When the rotary valve 89 is moved to emergency position the brake pipe 14 is connected to the exhaust port 95 through the cavity 96 and the valve chamber 92 to effect a reduction in brake pipe pressure at an emergency rate.

The application magnet valve device 11 comprises a casing containing a chamber 97 that is in constant open communication with the straight air pipe 8, and a valve chamber 98 that is in constant open communication with supply reservoir 6 through supply passage and pipe 5, and which contains an application valve 99 that is operatively connected to a magnet 102 in the upper part of the casing which, when energized, forces the valve downwardly from its seat against the bias of a spring 103 provided in the valve chamber 98.

The release magnet valve device 12 comprises a release valve chamber 104 that is in constant communication with the supply reservoir 6 through passage and pipe 5, an intermediate chamber 105 that is in constant communication with the piston chamber 106 of the supply relay valve 16 through pipe 107, and a release chamber 108 that is in constant communication with the atmosphere through the exhaust port 109. A release valve 111 is provided in the chamber 108 and a valve 112 is provided in the chamber 104, the two valves being operatively connected to a magnet 113 in the upper part of the casing which, when energized, forces the valves 111 and 112 downwardly against the bias of a spring 114 in the valve chamber 104, thus forcing the valve 111 to its seat to close communication between the chamber 105 and the atmosphere, and forcing valve 112 from its seat to open communication between the supply pipe 5 and the piston chamber 106.

The relay valve device 16 comprises a casing having the aforesaid piston chamber 106 containing a piston 115 provided with a stem 116 operatively connected to a valve 117 provided in a valve chamber 118 which contains a spring 119 for normally biasing the valve 117 to its rib seat 122. A release chamber 123 is provided between the piston 115 and the valve chamber 118 that is in open communication with the atmosphere through the exhaust port 124.

The automatic valve device 7 comprises a casing providing a piston chamber 125 containing a piston 126 therein that is operatively connected by means of a stem 127 to a main slide valve 128 and a pilot valve 129 within a slide valve chamber 132 also provided in the casing and in constant communication with the auxiliary reservoir 13, for controlling communication to the control pipe 4 from the auxiliary reservoir 13 or from the straight air pipe 8.

The relay valve device 3 comprises a casing having a piston chamber 133 constantly connected to the control pipe 4 and to the brake cylinder volume reservoir 134 and containing a piston 135 which is adapted through the medium of a stem 136 to operate a slide valve 137 that is operatively connected to the stem and contained in a valve chamber 138 that is constantly connected to the brake cylinders 1 and 2 through a brake cylinder pipe 139. Also contained in the casing is a supply valve chamber 141 in open communication with the supply reservoir 6, and containing a supply valve 142 which is subject to the pressure of a spring 143 and which is provided with a stem 144 that is adapted to be operatively engaged by the end of the piston stem 136.

The relay valve 3 is shown with the relay piston 135 and the slide valve 137 in their extreme left or brake releasing positions. With the slide valve 137 in this position the valve chamber 138 and consequently the brake cylinders 1 and 2 are connected to the atmosphere through an exhaust passage 145. With the piston 135 in release position the stem 136 will be out of engagement with the end of the supply valve stem 144 so that the pressure of the spring 143 will maintain the supply valve 142 seated against its seat rib 146, thereby maintaining communication closed from the supply valve 5 to the valve chamber 138.

The cut-off valve device 17 comprises a casing containing a valve chamber 147 that is in constant communication with the piston chamber 148 of the supply relay valve device 22 through pipe 152, a chamber 153 that is in constant open communication with the main reservoir pipe 18, and a release chamber 154 that is in constant communication with the atmosphere through the exhaust port 155. A double beat valve 156 is provided within the valve chamber 147 for controlling communication from the piston chamber 148 to the main reservoir pipe 18 or to the atmosphere. A spring 157 is provided in the chamber 153 for forcing the valve 156 upwardly to its upper seated position, and a magnet 158 is provided in the upper part of the casing which, when energized, forces the double beat valve 156 downwardly to its lower seat against the bias of the spring 157.

The supply relay valve device 22 comprises a casing containing the aforesaid piston chamber 148, a chamber 159 that is in constant open communication with the atmosphere through port 160, a chamber 161 that is in constant open communication with the supply valve chamber 33 of the brake valve device 9 through passage and pipe 23, and a valve chamber 162 that is in constant open communication with the main reservoir pipe 18. The piston chamber 148 contains a piston 163 provided with a stem 164 extending through the chamber 159 and operatively engaging a valve 165 within the valve chamber 162. When pressure is exerted in the piston chamber 148 to force the piston 163 and the valve 165 downwardly, the valve is forced against the bias of a spring 167 provided in the chamber 162 away from the rib seat 166, thus maintaining communication between the main reservoir pipe 18 and the supply valve chamber 33 of the brake valve device.

The signal magnet valve device 24 comprises a casing containing a chamber 172 that is in constant open communication with the main reservoir pipe 18, a chamber 173 that is in constant open communication with the whistle 25 through pipe 174, and which contains a valve 175 that is operatively connected to a magnet 176 in the upper part of the casing which, when energized, forces a valve 175 downwardly to its seat against the bias of a spring 177 contained within the chamber 172.

The conductor's valve device 26 may comprise a casing containing a chamber 182 that is in constant communication with the brake pipe 14. A valve 183 is contained within the chamber 182 for controlling communication between the chamber 182 and a chamber 184 that is connected through the exhaust port 185 to the atmosphere. The valve 183 is normally biased upwardly to its seated position by a spring 186, thus closing communication from the brake pipe 14 to the atmosphere. A valve stem 187 extends upwardly from the valve 183 and engages a valve lever 188 pivoted on a pin 189 mounted on the valve casing. An operating lever 192 is pivotally mounted upon a pin 193 carried on a bracket extending upwardly from the valve casing and which, when moved in either direction, forces the valve lever 188 downwardly, unseating the valve 183 and permitting fluid under pressure to be vented from the brake pipe 14 to the atmosphere through the exhaust port 185.

The retardation controller device 15 comprises an inertia device such as a pendulum 194 pivotally mounted on a pin 191 and adapted to move toward the left in accordance with the rate of retardation of the vehicle. A pair of contact members 195 and 196 that are normally in engagement are provided for completing a circuit from the brake valve device through the conductor 88 to an application magnet valve conductor 197 for controlling the energization of the application magnet valve devices 11 of the several braking units of the train. A pair of normally disengaged contact members 198 and 199 are provided which control the energization of the magnet 158 of the cut-off magnet valve device 17. An insulating stop member 202 is provided for normally maintaining the contact member 199 out of engagement with the contact member 198. A similar insulating stop 203 is provided for preventing the contact member 196 from moving toward the left more than a predetermined amount. Insulating members 204 are provided for maintaining the contact members 198 and 195 out of engagement.

An operating member 205 is mounted on the pendulum 194 for operatively engaging the contact member 195 to move it toward the left out of engagement with the contact member 196, and for moving the contact member 198 into engagement with the contact member 199 for a purpose to be later explained. The pendulum 194 also carries a contact member 206 that is adapted to engage a contact member 207 for closing a circuit from the battery 208 to the release magnet valve conductor 83.

In each of Figs. 1, 2 and 3, a dot and dash line extends upwardly substantially centrally of the figures to divide the apparatus used on each of the two illustrated brake units which may represent the brake units of two cars of the train. It will be noted that the brake pipe 14, the straight air pipe 8, and the several conductors 80, 209, 197 controlling the application magnet valve devices 11 and the release magnet valve devices 12 each extend throughout the length of the train to effect like operation of each brake unit. Each train section, in this case illustrated as comprising two brake units, is provided with its individual main reservoir and main reservoir pipe and its own compressor mechanism, not shown. Each of the several brake units consists of the same parts which are correspondingly numbered.

In addition to the application magnet valve wire 197 and the release magnet valve wire 80 that extend throughout the length of the train to energize the several application and release magnet valve devices, a common return wire 209 is also provided for completing the circuits through the application and release magnet valve wires to the negative terminal of the battery 208. A branch circuit from the wire 209 extends from the rear of the train through conductor 212 and a number of signal switch devices 214, one being illustrated for each braking unit, the contact members 224 of a number of pressure operated switches 215, one being illustrated for each train section, which when the circuit is closed maintains the magnet 176 of the signal magnet valve device 24 energized, and the visible signal lamp 213 also energized to indicate that the control and signal circuit is complete.

Each signal switch device 214 is provided with a contact making switch element 216 that is normally biased to a circuit closing position by a spring 217 and is provided with manually operated means 218 for moving the switch contact element to a circuit interrupting position. The pressure operated switch device 215 comprises a casing containing a chamber 219 that is in constant communication with the main reservoir pipe 18 and contains a diaphragm 222 that is operatively connected to a stem 223 extending upwardly for urging the switch contact member 224 to a circuit closing position upon the supply of fluid under pressure to the chamber 219, and to permit the contact 224 to move to a circuit interrupting position upon the venting of fluid from the chamber 219.

The intermediate section of the train, illustrated in Fig. 2, is also provided with a brake valve device 9, a retardation controller device 15, a cut-off valve device 17, a supply relay valve device 22, and with the control circuits necessary to effect complete control of the section and of any following sections of the train from the brake valve device of that section. This section may therefore be disconnected from the front portion of the train and operated as a separate section over branch lines together with other intermediate sections equipped with the apparatus shown in Fig. 2, or other trailing sections as shown in Fig. 3, if desired. In order to determine whether the brake equipment will be controlled from the brake valve device at the front of the train or the brake valve device on the intermediate section, a changeover device 225 is provided having a handle 226 for operating a transfer valve 227 and a transfer switch mechanism 228, best shown in Figs. 6 and 7.

When the changeover mechanism is in the position illustrated in Fig. 6, the control of the train will be from the brake valve device at the front of the train, it being noted that the valve 227 is in such position as to connect the straight air pipe 8 of one section with the straight air pipe 8 of the adjoining section and the brake pipe 14 of one section with the brake pipe 14 of the adjoining section, thus making continuous brake pipe and straight air pipe connections throughout the train. It will also be noted that the connection from the main reservoir pipe 18 of the intermediate section to the signal magnet valve device 24 of that section is completed only through a branch pipe 232 and that communication between the main reservoir pipe 18 and the branch pipe 232 is closed when the valve 227 is in the position illustrated in Fig. 6.

It will also be noted that the signal wire 212 is completed through a switch conducting member 229 in the switch mechanism 228 when the mechanism is in the position illustrated in Fig. 6, thus completing the signal circuit to the magnet of the signal magnet valve device 24 and to the visual indicator 213 at the front end of the train. A branch of the wire 212 is connected to the magnet 176 of the signal magnet valve device 24 on each intermediate section of the train (see Fig. 2) without going through the transfer mechanism. Switch members 233, 234 and 235 are provided in the switch device 228 of the transfer mechanism for connecting the release magnet valve wire 80, the neutral return wire 209 and the application magnet valve wire 197, respectively, with the branch release conductor 80a, neutral conductor 209a, and application conductor 197a for control by the brake valve device 9 and the retardation controller device 15 of the intermediate section, when the changeover device is in the position illustrated in Fig. 7, in which position the brake equipment illustrated in Fig. 2 of the drawings will be controlled from the brake valve device 9 and the retardation controller device 15 in that section. In this position of the changeover mechanism it will be noted that the straight air pipe 8 and the brake pipe 14 of the intermediate section are no longer in communication with the corresponding straight air pipe 8 and brake pipe 14 of the forward section, but are in communication, respectively, with the branch straight air pipe 8a and a branch brake pipe 14a communicating with the brake valve device 9 of the intermediate section. Likewise the pipe 232 leading to the signal magnet valve device 24 of the intermediate section is connected to the main reservoir pipe 18 of that section through valve port 236. Obviously any number of intermediate sections having the equipment illustrated in Fig. 2 and any number of trailer sections having the equipment illustrated in Fig. 3 may be provided on a multiple section train and any number of trailer or intermediate sections may be connected to the front or control section upon the splitting up of the main train into sections.

Charging the system

The main reservoir pipe 18 on each train section is charged at a reduced pressure by the feed valve device 19, from the main reservoir 21 of that train section. Fluid under pressure flows from the main reservoir pipe 18 to the chamber 172 of the signal magnet valve device 24, charging this chamber. Fluid under pressure also flows from the main reservoir pipe 18 through the chamber 153 and the valve chamber 147 of the cut-off magnet valve device 17, and pipe 152, to charge the piston chamber 148 of the supply relay valve device 22, thus forcing the piston 163 and the valve 165 downwardly, opening communication for charging the supply valve chamber 33 of the brake valve device 9 from the main reservoir pipe 18, through the valve chamber 162 and the chamber 161 of the supply relay valve device 22 and the supply pipe and passage 23. The brake pipe 14 is charged from the main reservoir pipe 18 through the valve chamber 92 in the lower part of the brake valve device 9 and through cavity 93 in the rotary valve 89.

The chamber 132 of each of the conductor valve devices is charged from the brake pipe 14 as is also the piston chamber 125 of the automatic valve devices 7, from which fluid under pressure flows through the feed groove 237 past the piston 126 to charge the slide valve chamber 132 and the auxiliary reservoir 13. Fluid under pressure also flows from the main reservoir pipe 18 past the ball valve 239 of the check valve device 238 to charge the supply pipe 5, the supply reservoir 6, the valve chamber 98 of the application magnet valve device 11, the valve chamber 104 of the release magnet valve device 12, and through chamber 105 and pipe 107, to the piston chamber 106 of the release relay valve device 16. Fluid under pressure also flows from the main reservoir pipe 18 to charge the chamber 219 of the pressure operated switch device 215 to force the contact member 224 to a closing position.

Straight air application of the brakes

If the operator wishes to make a service application of the brakes utilizing the straight air portion thereof, the handle 79 of the brake valve device 9 is moved from its release position an amount dependent upon the degree of application of the brakes desired. Upon the initial movement of the handle from its release position, the sloping surface of the cam 75 against the plunger 66 forces the plunger toward the right. The first part of this movement effects a compression of the release valve spring 59 and forces the release valve 54 to its seat, closing communication between the pressure chamber 32 and the atmosphere through passage 53, release valve chamber 52, and passages 56 and 48. In the release position of the brake valve device, as illustrated in Fig. 4, the contact members 82 and 84 complete a circuit from the positive terminal of the battery 208 through conductor 83, contact members 84 and 82, the release conductor 80 to the winding of the magnets 113 of the several release magnet valve devices 12 and by the conductor 209, which serves as a common return wire, to the other terminal of the battery 208, thus energizing the magnets 113 and forcing the valves 111 and 112 downwardly, and closing communication from the piston chamber 106 of the relay valve device 16 to the atmosphere through the exhaust port 109, and effecting communication from the supply pipe 5 past the unseated valve 112 to the piston chamber 106 to force the piston 115 toward the left against the bias of the spring 119 to effect communication from the control pipe 4 to the atmosphere through the valve chamber 118, the release chamber 123, and the exhaust port 124.

Upon movement of the release valve 54 to its seated position above described, the stem 50 carrying the contact member 82 is moved sufficiently toward the right to interrupt the circuit through the contact members 82 and 84, thus deenergizing the magnets 113 of the release magnet valve devices 12 and permitting the spring 114 in the valve chamber 104 to force the valves 112 and 111 upwardly, bringing the valve 112 to its seat and closing communication from the supply pipe 5 to the piston chamber 106 of the relay valve device 16, and opening communication from the piston chamber 106 past the unseated valve 111 through exhaust port 109 to the atmosphere. As the piston chamber 106 is thus vented to the atmosphere, the spring 119 forces the valve 117 to its seat rib 122, thus closing communication from the control pipe 4 to the atmosphere through the chamber 123 and the exhaust port 124.

Further movement of the plunger 66 of the brake valve device 9 toward the right causes the spaced levers 64 to pivot about their lower end, further movement of the roller 69 being prevented by the stiffness of the regulating spring 49, thus causing the rod 73 to force the supply valve 34 against the compression of the supply valve spring 37 to open communication between the supply pipe and passage 23 and the pressure chamber 32 through the supply valve chamber 33, thus supplying fluid under pressure from the main reservoir pipe 18 through the supply pipe 23 and the pressure chamber 32 to the straight air pipe 8.

Upon movement of the rod 73 toward the right to force the supply valve 34 from its seat, the contact member 87 carried thereby engages the contact members 85 and 86 to close a circuit from one terminal of the battery 208 through conductor 83, contact members 85, 86, 87, conductor 88, the engaging contact members 195 and 196 of the retardation controller device 15, to the application magnet valve conductor 197 and the windings of the magnets 102 of the application magnet valve devices 11, to the return conductor 209 and to the other terminal of the battery 208, thus energizing the magnets 102 and forcing the application valve 99 downwardly against the force of the spring 103 to open communication from the supply reservoir 6 through the supply pipe 5, the application valve chamber 98 and the chamber 97 to the straight air pipe 8. Thus fluid under pressure is supplied to the straight air pipe 8 both through the brake valve device 9 and through the application magnet valve devices 11 associated with each braking unit of the train.

The pressure established in the pressure chamber 32 of the brake valve device 9 and in the straight air pipe 8 is dependent upon the degree of movement of the operating lever 79 and of the plunger 66 from their release positions. Since, when the pressure within the chamber 32 increases due to the flow of fluid thereto through the supply valve chamber 33, a like pressure is exerted on the chamber side of the piston 45 in opposition to the pressure exerted by the regulating spring 49, this pressure continues to build up until it becomes sufficient to force the piston 45 toward the right, thus relieving the pressure on the roller 69 and permitting the supply valve spring 37 to force the rod 73 toward the left, bringing the supply valve 34 to its seat and pivoting the lever 64 about the roller 69. The amount of pressure on the chamber side of the piston 45 necessary to effect the sufficient movement of the piston 45 to cause the supply valve 34 to seat is dependent upon the amount of movement of the operating lever 79 and of the plunger 66 from their release positions. The greater the movement of the operating lever 79 from its release position, the greater will be the amount of movement of the pivot pin 65 toward the right, and consequently the greater will be the compression of the regulating spring 49 necessary to permit movement of the lever 66 and of the rod 73 to effect the seating of the supply valve 34. It will be apparent, therefore, that the brake valve device is self-lapping on a pressure basis, the degree of fluid pressure within the pressure chamber 32 necessary to effect the movement of the valve to lap position being dependent upon the degree of movement of the operating lever 79 from its release position.

As the rod 73 moves toward the left to permit the supply valve 34 to seat, the contact member 87 carried thereby is moved out of engagement with the contact member 85, thus interrupting the application magnet valve circuit, the de-energized magnet permitting the spring 103 in the valve chamber 98 to force the application valve 99 to its seat to close communication between the supply pipe 5 and the supply reservoir 6 to the straight air pipe 8. Thus, movement of the supply valve 34 to its seat also controls the movement of the application valve 99 of the several application magnet valve devices 11 to their seats to simultaneously close communication between the main reservoir pipe 18 and the straight air pipe 8.

Fluid under pressure thus supplied to the straight air pipe 8 flows to the piston chamber 133 of the relay valve device 3 and to the brake cylinder volume reservoir 134 through the cavity 242 in the main slide valve 128 of the automatic valve device 7 in its release or illustrated position.

Fluid under pressure thus supplied to the piston chamber 133 of the relay valve device 3, causes the relay piston 135 to move toward the right carrying the slide valve 137 with it. As the relay piston and slide valve are thus moved the slide valve laps the release port 145, closing communication from the relay slide valve chamber 138 to the atmosphere. After the port 145 is lapped the end of the piston stem 136 engages the stem 144 of the supply valve 142 and causes this valve to be unseated from its seat rib 146 against the pressure of the spring 143. With the supply valve 142 unseated, fluid under pressure is supplied from the supply reservoir 6 through the supply pipe 5 and valve chamber 141, past the unseated valve 142 to the slide valve chamber 138 and the brake cylinder pipe 139 to the brake cylinders 1 and 2.

With the relay valve in this position the force exerted to move the piston 135 and the valve 137 away from the supply valve 142 consists of the pressure within the slide valve chamber 138 plus the force of the spring 143. When the pressure within the chamber 138 builds up to substantially the pressure on the face of the piston 135, as supplied by the control pipe 4 to the piston chamber 133, the piston is moved away from the supply valve 142 sufficiently to permit it to seat and cut off communication between the supply pipe 5 and the brake cylinders 1 and 2. When the supply valve 142 seats, the spring 143 is no longer effective to force the valve stem 144 against the piston stem 136 so that the piston 135 and the slide valve 137 do not move further toward the left or sufficiently to unlap the release port 145. Fluid under pressure is therefore retained in the valve chamber 138 and in the brake cylinders 1 and 2 that is substantially equal to the pressure in the control pipe 4 and straight air pipe 8.

If the rate of retardation of the vehicle increases sufficiently, or until it reaches a given predetermined value, the pendulum 194 of the retardation controller device 15 will be forced toward the left sufficiently to cause the operating member 205 carried by the pendulum to move the contact member 195 out of engagement with the contact member 196 to interrupt the circuit through the application magnet valve conductor 197, to thus prevent a further increase in the degree of application of the brakes through the application magnet valve devices. At substantially the same time, the contact member 198 engages the contact member 199 to close a circuit extending from the positive terminal of the battery 208 through the conductor 83, contact members 198 and 199, conductor 240, the winding of the magnet 158 of the cut-out magnet valve device 17 and conductor 299 to the negative terminal of the battery 208, thus energizing the magnet 158 and causing it to force the double beat valve 156 downwardly to its lower seat, thus closing communication from the main reservoir pipe 18 to the piston chamber 148 of the supply relay valve device 22 and opening communication from the piston chamber 148 to the atmosphere through the exhaust port 155. Upon the release of fluid under pressure from the piston chamber 148, the spring 167 forces the valve 165 upwardly to its seat rib 166 to close communication from the main reservoir pipe 18 to the straight air pipe 8 through the relay valve device 22, the supply pipe 23, and the supply valve chamber 33 of the brake valve device 9.

Upon a further predetermined increase in the rate of retardation of the vehicle the contact member 206 carried by the pendulum 194 engages the contact member 207, thus completing a circuit from the battery 208 to the release magnet valve conductor 80 to energize the windings of the magnets 113 of the several release magnet valve devices 12, thus causing the valve 111 to be forced downwardly to its seat against the bias of the spring 114 to close communication from the piston chamber 106 of the relay valve device 16 to the atmosphere through the exhaust port 109 and to also force the valve 112 downwardly from its seat to effect communication from the supply pipe 5 and the supply reservoir 6 to the piston chamber 106 of the relay valve device 16. Pressure thus supplied to the piston chamber 106 forces the piston 115 and the valve 117 toward the left to unseat the valve 117 and effect communication from the control pipe 4 to the atmosphere through the valve chamber 118, chamber 123, and the exhaust port 124 of the relay valve device 16 to effect a reduction in control pipe pressure.

The reduction in control pipe pressure and in the pressure within the piston chamber 133 of the relay valve device 3 causes the piston 135 to be moved toward the left from lap position on account of the greater pressure within the chamber 138, thus unlapping the exhaust port 145 to effect a reduction in brake pipe pressure by flow of fluid under pressure from the brake cylinders 1 and 2 through the brake pipe 139, the slide valve chamber 138, and the exhaust port 145 to atmosphere. As the rate of retardation of the vehicle decreases sufficiently to cause the pendulum 194 to separate the contact members 206 and 207, the above traced circuit through the winding of the magnets 113 of the release magnet valve devices 12 is interrupted, permitting the valves 111 and 112 to be forced upwardly by the spring 114 and effecting a release of fluid under pressure from the piston chamber 106 of the relay valve device 16 to the atmosphere through the exhaust port 109. The reduction of pressure in the piston chamber 106 permits the valve 107 to again seat against its rib seat 122 and prevent further reduction in control pipe pressure. When the pressure in the brake cylinder and in the slide valve chamber 138 has been reduced to substantially the pressure within the piston chamber 133 of the relay valve device 3, which corresponds to control pipe pressure, the greater pressure in the piston chamber 133 forces the piston 135 and the slide valve 137 again to lap position to retain a pressure within the brake cylinder corresponding to control pipe pressure.

If the operator now wishes to release the brakes, the brake valve handle 79 and the cam 75 are moved toward release position, thus relieving pressure on the plunger 63 and permitting the release valve spring 59 to force the release valve 54 toward the left from its seat, thus opening communication from the pressure chamber 32 and the straight air pipe 8 to the atmosphere through the passage 53 in the movable abutment 45, the release valve chamber 52, the passage 56, chamber 47 and the exhaust port 48. As the release valve 54 is moved from its seat the contact member 82 carried by the release valve stem 50 engages the contact member 84, thus closing the above traced circuit through the conductors 83, 80, and the windings of the magnets 113 of the several release magnet valve devices 12 thus forcing the valves 111 and 112 downwardly to their illustrated positions to effect the release of fluid under pressure from the straight air pipe 8 and the control pipe 4 to the atmosphere through the exhaust port 124 of the relay valve device 16, as above described.

It will be noted that, when the brake valve handle 79 is moved to a position within the self-lapping zone to effect application of the brakes by operation of the straight air portion thereof, should the circuit to the magnet valve devices 11 and 12 fail for any reason such as by breaking of the conductors or the complete failure of the battery 208, there would nevertheless be a supply of fluid under pressure to the straight air pipe 8 through the supply valve chamber 33 and the pressure chamber 32 of the brake valve device to effect straight air operation of the brakes.

*Automatic application of the brakes*

Should the operator desire a pneumatic service application of the brakes, the brake valve handle 79 is moved to a position to effect registration of the cavity 94 in the rotary valve 89 (Fig. 5) with the brake pipe passage 14 and the release passage 95, thus effecting a reduction in brake pipe pressure at a service rate. Upon a reduction in brake pipe pressure the pressure within the piston chamber 125 of the automatic valve device 7 is correspondingly reduced, thus effecting movement of the piston 126 toward the left as a result of the greater pressure within the valve chamber 132 until the piston engages the graduating stem 243 that is held in its illustrated position by the spring 244 upon a moderate differential in pressures on the two sides of the piston 126. Upon movement of the piston 126 to this position the pilot valve 129 will have been moved toward the left sufficiently to unlap the port 245 in the main slide valve 128 and the lug 246 on the end of the piston stem will have engaged the outer end of the slide valve 128 and moved it toward the left sufficiently to cause registration between the port 245 in the slide valve 128 and the passage 4 leading to the control pipe 4, thus effecting the supply of fluid under pressure from the auxiliary reservoir 13 to the piston chamber 133 of the relay valve device 3 through the main slide valve chamber 132, the valve port 245, and passage and pipe 4. The relay valve device 3 operates in the manner above described to effect brake cylinder pressure corresponding to the pressure in the control pipe 4.

Upon movement of the brake valve handle 79 to a brake applying position either in the self-lapping zone or to effect pneumatic service or emergency application of the brakes, the contact member 82 is moved toward the right, as above described, under straight air application of the brakes to interrupt the circuit through the magnet valve devices 12 to cause the release of fluid under pressure from the piston chamber 106 of the relay valve devices 16 to permit the relay to close communication from the control pipe 4 to the atmosphere through the exhaust port 124.

If the operator desires to make an emergency application of the brakes, the handle 79 is moved to its extreme position from release position thus bringing the cavity 96 in the rotary valve 89 to a position to effect communication between the brake pipe and passage 14 and the release passage 95 to effect a reduction in brake pipe pressure at an emergency rate. A reduction in brake pipe pressure at an emergency rate vents fluid under pressure from the piston chamber 125 at a rate sufficient to effect a considerable differential in pressure between the slide valve chamber 132 and the piston chamber 125, to effect movement of the piston 126 and pilot valve 129 and slide valve 128 toward the left, bringing the piston against the graduating stem 243 with sufficient force to cause the spring 244 to be compressed and to effect a sufficient movement of the slide valve 128 to bring the right hand end of the slide valve to a position to unlap the passage 4, leading to the control pipe and to the piston chamber 133 of the relay valve device 3.

It will be noted that the release of fluid under pressure from the control pipe 4 is effected by operation of the relay valve device 16 and may be effected whether or not the slide valve 128 of the automatic valve device 7 is in a position to effect communication between the control pipe 4 and the straight air pipe 8. Therefore, the retardation controller 15 is effective to control the release magnet valve devices 12 and the relay valve devices 16 to effect the release of the brakes whether the brakes have been applied by straight air pressure or by operation of the automatic valve device 7.

If the operator now wishes to release the brakes, the brake valve handle 79 is moved to release position, thus effecting the supply of fluid under pressure to the brake pipe 14 from the main reservoir pipe 18 through the valve chamber 92 as in charging the equipment. As the pressure in the brake pipe 14 builds up, the pressure in the piston chamber 125 of the automatic valve device 7 correspondingly builds up, thus forcing the piston 126, the pilot valve 129 and main valve 128 to their illustrated positions, and again bringing the contact members 82 and 84 of the brake valve device 9 into engagement to again energize the winding of the magnets 113 of the release magnet valve devices 12 to operate the relay valve devices 16 to the illustrated position to effect the release of fluid under pressure from the control pipe 4 to the atmosphere through the exhaust port 124 to effect the operation of the relay valve device 3, as above described, to its illustrated position to effect a reduction in brake cylinder pressure through the exhaust port 145.

It will be noted that the release magnet valve devices 12 are normally energized when the brake valve handle 79 is in release position, and that the application magnet valve devices 11 are deenergized. A visual signal 248, such as a lamp, is provided for indicating the interruption of the circuit to the release magnet valve devices 12 upon separation of the contact members 82 and 84 of the brake valve device. A similar visual indicator 247 is provided to be energized when the circuit through the conductor 197 for energizing the winding of the application magnet valve devices 11 is connected to the source of electrical energy through the contact members 85, 86 and 87 of the brake valve device. Thus the signal 248 indicates that the windings of the magnets 113 of the release magnet valve devices 12 are energized while the visual signal 247 indicates that the windings of the magnets 102 of the application magnet valve devices 11 are energized.

The signal 213 and the winding of the magnet 176 of the signal magnet valve device 24 are normally energized by a circuit extending from the positive terminal of the battery 208 through conductor 83, branch parallel circuits including, respectively, the signal 213 and the winding of the magnet 176, through signal conductor 212, the several signal switch devices 214, and the pressure switch devices 215 and the neutral return conductor 209 to the negative terminal of the battery 208. If, for any reason, this circuit is not completed, such as might result from failure to properly connect the conductors in the cable between the train sections upon making up the train, the visual indicator 213 and the magnet valve device 24 will not be energized, thus the valve 175 will be forced upwardly from its seat by the spring 177, permitting the flow of fluid under pressure from the main reservoir pipe 18 through valve chamber 173 and pipe 174 to the whistle 25 to produce an audible signal, while the failure of the signal 213 also indicates that the checking of the signal circuit is incomplete. Should, for any reason, the main reservoir pressure in any one of the train sections be lost, as by breaking a main reservoir pipe, the pressure operated switch device 215 on that section will interrupt the checking circuit by movement of the switch contact members 224 to a circuit interrupting position, thus giving an indication that the brake equipment was not in proper operating condition. The various signal switches 214 along the train may be used to signal the operator by periodically interrupting the circuit to give short signals on the whistle 25 and on the visual indicator 213. If, for any reason, it is desirable to cut out of service the signal device last described, as when disconnecting intermediate sections from the train at junction points, a switch member 249 may be closed, thus energizing the winding of the magnet 176 and the signal 213 therethrough without using the circuit extending throughout the length of the train over the conductors 209 and 212.

Should it be desired to operate a portion of the train, such as the middle section illustrated in Fig. 2, as a separate train unit, for example, from a junction point over a branch line, this section of the train may be disconnected from the other train sections and the control of the brakes transferred to the brake valve device on that section by closing communication between the adjoining sections of brake pipe 14 by angle cock 253, and between adjoining sections of straight air pipe through angle cock 254, and between adjoining train section conductors 212, 80, 209 and 197 for controlling the magnet valve devices through the cable connecter 255, and the control of the brakes may be transferred to the brake valve device on that section by moving the handle 226 of the transfer device 225, from the position illustrated diagrammatically in Fig. 6 to the position illustrated diagrammatically in Fig. 7, to thus connect the straight air pipe 8 of the middle section with the branch straight air pipe 8a leading to the brake valve device 9 of that section, and correspondingly connecting the brake pipe 14 of the middle section to the branch brake pipe 14a leading to the brake valve device 9 and connecting the main reservoir pipe 18 to the pipe 232 through the valve port 236 to supply fluid under pressure to the valve chamber of the signal magnet valve device 24 of that section of the train. As indicated in Fig. 7, the conductors 80, 209 and 197 for controlling the magnet valve devices 11 and 12 are connected by switches 233, 234 and 235 to the branch conductors 80a, 209a and 197a of the intermediate section of the train, which conductors lead to the brake valve device 9 and to the retardation controller device 15 and are controlled thereby in the manner above described with respect to a first section of the train. When an intermediate train section is connected as a portion of a longer train, and it is not desired to use the brake controlling equipment of that section to control the train, the transfer device may be shifted from the position illustrated in Fig. 7 to the position illustrated in Fig. 6, which is necessary before the circuit through the signal circuit conductor 212 may be completed by the switch member 229 of the transfer device 225, in order that the audible signal 25 and the visual signal 213 may indicate that the control circuit for the train has been completed as intended.

While one preferred embodiment of my invention has been illustrated and described, it will be apparent to those skilled in the art that many modifications and changes in the apparatus and circuits illustrated may be made within the spirit of my invention and I do not wish to be limited otherwise than by the scope of the appended claims.

Having now described my invention, what I claim as new and desire to secure by Letters Patent, is:

1. In a brake equipment for vehicles, in combination, a plurality of braking units each comprising a brake cylinder, a source of fluid under pressure, a straight air pipe common to all braking units for controlling the degree of application of the brakes, means for controlling the pressure in said straight air pipe comprising magnet valve devices associated with each braking unit and a brake valve device for controlling communication from said source of fluid under pressure to said straight air pipe and for controlling operation of said magnet valve devices, a magnet valve device for controlling communication from said source to said brake valve device, and a retardation controller device responsive to the rate of deceleration of the vehicle for controlling said magnet valve devices to limit the supply of fluid under pressure to said straight air pipe.

2. In a brake equipment for vehicles, in combination, a plurality of braking units each comprising a brake cylinder, a source of fluid under pressure, a straight air pipe common to all braking units for controlling the degree of application of the brakes, means for controlling the pressure in said straight air pipe comprising an application and a release magnet valve device associated with each braking unit for controlling communication from said source of fluid under pressure to said straight air pipe and a brake valve device for controlling communication from a source of fluid under pressure to said straight air pipe and for controlling the operation of said magnet valve devices, a magnet valve device for controlling communication from said source to said brake valve device, and a retardation controller responsive to the rate of retardation of the vehicle for controlling the operation of said release magnet valve device and said application magnet valve device to close communication to said straight air pipe upon a predetermined rate of retardation of the vehicle and for controlling the operation of said release magnet valve device to reduce straight air pipe pressure upon a higher predetermined rate of retardation of the vehicle.

3. In a brake system for vehicles, in combination, a plurality of braking units each comprising a brake cylinder, means for controlling the supply of fluid under pressure to the brake cylinder comprising an automatic portion having an automatic valve and a brake pipe for applying the brakes in accordance with a reduction in brake pipe pressure and a straight air portion having a straight air pipe and means for controlling the degree of application of the brakes in accordance with straight air pipe pressure, means for controlling the pressure in said straight air pipe comprising an application magnet valve device and a release magnet valve device associated with each brake unit and a brake valve device for controlling the operation of said magnet valve devices, said brake valve device also having valve means operative independently of the operation of said magnet valve devices to control the supply of fluid under pressure to, and the release of fluid under pressure from, said straight air pipe in accordance with the operation of said brake valve device to control said magnet valve devices, and a retardation controller operative in accordance with the rate of retardation of the vehicle for limiting the degree of application of the brakes.

4. In a brake system for vehicles, in combination, a plurality of braking units each comprising a brake cylinder, means for supplying fluid under pressure to the brake cylinder comprising an automatic control portion having an automatic valve and a brake pipe for applying the brakes in accordance with the reduction in brake pipe pressure, and a straight air portion having a straight air pipe and means for controlling the degree of application of the brakes in accordance with straight air pipe pressure, means for controlling the supply of fluid under pressure to said straight air pipe comprising an application magnet valve device on each braking unit and a brake valve device for controlling said several application magnet valve devices and having valve means for supplying fluid under pressure to said straight air pipe through said brake valve device when said brake valve device is in a position to effect the supply of fluid under pressure to said straight air pipe by said magnet valve devices, a cut-off magnet valve device for closing communication through which fluid under pressure is supplied to said straight air pipe through said brake valve device, and a retardation control device responsive to the rate of retardation of the vehicle for closing the communication to said straight air pipe controlled by said cut-off magnet valve device and said application magnet valve devices.

5. In a brake equipment for vehicles, in combination, a brake cylinder, a control pipe, a relay valve device for controlling the supply of fluid under pressure to said brake cylinder in accordance with the pressure in said control pipe, a straight air pipe and means for supplying fluid under pressure to said straight air pipe in accordance with a desired degree of application of the brakes, a brake pipe, an auxiliary reservoir, and an automatic valve device subject to brake pipe pressure for effecting communication between said control pipe and said straight air pipe when said automatic valve is in its release position and for effecting the supply of fluid under pressure to said control pipe from said auxiliary reservoir when said automatic valve is in its release position, a retardation controller responsive to the rate of retardation of the vehicle, means controlled by said retardation controller for limiting the supply of fluid under pressure to said straight air pipe upon a predetermined rate of retardation of the vehicle, and means responsive to a higher predetermined rate of retardation for effecting a reduction in control pipe pressure.

6. In a brake equipment for vehicles, in combination, a brake cylinder, a relay valve device for controlling the supply of fluid under pressure to said brake cylinder, a control pipe for controlling said relay valve device in accordance with control pipe pressure, means for controlling the supply of fluid under pressure to said control pipe comprising a brake pipe and an automatic valve subject to brake pipe pressure, additional means for controlling the supply of fluid under pressure to said control pipe comprising a straight air pipe that is in communication with said control pipe when said automatic valve is in its release position, and means for controlling the supply of fluid under pressure to said straight air pipe comprising an application magnet valve device and a brake valve device for controlling said magnet valve device and said automatic valve, a release magnet valve device also controlled by said brake valve device for controlling the release of fluid under pressure from said control pipe, and a retardation controller responsive to the rate of retardation of the vehicle for controlling said application magnet valve device to limit straight air pipe pressure and for controlling said release magnet valve device to reduce brake cylinder pressure upon a predetermined greater rate of retardation of the vehicle.

7. In a brake equipment for vehicles, in combination, a brake cylinder, a relay valve device for controlling the supply of fluid under pressure to said brake cylinder, a control pipe for controlling said relay valve device in accordance with the control pipe pressure, means for controlling the supply of fluid under pressure to said control pipe comprising a brake pipe and an automatic valve subject to brake pipe pressure, additional means for controlling the supply of fluid under pressure to said control pipe comprising a straight air pipe that is in communication with said control pipe when said automatic valve is in its release position, and means for controlling the supply of fluid under pressure to said straight air pipe comprising an application magnet valve device, a brake valve device having a handle for controlling said magnet valve device and said automatic valve and provided with a self-lapping valve for controlling the supply of fluid under pressure to said straight air pipe in accordance with the position of the handle independently of the operation of said application magnet valve device, a cut-off magnet valve device between the source of supply of fluid under pressure and said brake valve, a release magnet valve device for controlling the release of fluid under pressure from said control pipe, and a retardation controller device responsive to the rate of retardation of the vehicle for controlling said application magnet valve devices and said cut-off magnet valve device to limit the supply of fluid under pressure to said straight air pipe upon a predetermined rate of retardation of the vehicle, and for controlling said release magnet valve device to effect a reduction in brake cylinder pressure upon a predetermined greater rate of retardation of the vehicle.

8. In a brake equipment for vehicles comprising a plurality of train units adapted to be separated from one another to operate as individual trains, in combination, a brake cylinder on each unit, a main reservoir on each train unit, automatic means for applying the brakes comprising a brake pipe extending the length of the train, an automatic valve means on each train unit for controlling the supply of fluid under pressure to the associated brake cylinders, straight air means for applying the brakes comprising a straight air pipe extending the length of the train, a supply reservoir on each train unit, application and release magnet valve devices on each train unit for controlling the supply of fluid under pressure from said supply reservoir to said straight air pipe, said several application magnet valve devices being controlled through one circuit conductor extending throughout the train and said several release magnet valve devices being controlled through another circuit conductor extending throughout the train, and a signal circuit for indicating the integrity of said magnet valve device circuits and signal means operated by said signal circuit.

9. In a brake equipment for vehicles comprising a plurality of train units certain of which are adapted to be separated from one another to operate as individual trains, in combination, a brake cylinder on each unit, a main reservoir on each unit, automatic means for applying the brakes comprising a brake pipe extending throughout the length of the train, an automatic valve means on each train unit for controlling the supply of fluid under pressure to the associated brake cylinders, straight air means for controlling the application of the brakes comprising a straight air pipe extending the length of the train, application and release magnet valve devices on each train unit for controlling the supply of fluid under pressure to, and the release of fluid under pressure from, said straight air pipe, electrical means extending throughout the train for controlling the several application magnet valve devices, electrical means extending throughout the length of the train for controlling said release magnet valve devices, a signal circuit and means controlled thereby for indicating the integrity of said magnet valve device circuits, and means responsive to a loss of main reservoir pipe pressure on any train unit for interrupting said last named circuit.

10. In a brake equipment for vehicles comprising a plurality of train units adapted to be separated from one another to operate as individual trains, in combination, a brake cylinder on each unit, a main reservoir on each unit, automatic means for applying the brakes comprising a brake pipe extending the length of the train and automatic valve means on each train unit for controlling the supply of fluid under pressure to the associated brake cylinder, straight air means for applying the brakes comprising a straight air pipe extending the length of the train, application and release magnet valve devices on each train unit for controlling the supply of fluid under pressure to, and the release of fluid under pressure from, said straight air pipe, circuit controlling means extending through the train for controlling said several application magnet valve devices, circuit means extending through the train for controlling said several release magnet valve devices, a circuit for indicating the integrity of said magnet valve device circuits and signal means actuated upon the interruption of said last named circuit, a brake valve device on each of a plurality of train units each having a brake pipe branch and a straight air pipe branch, a control device on at least one of said train units following the first for connecting the straight air pipe and the brake pipe of said train units together and for connecting said magnet valve device circuit between said units together to place the operation of the brakes under the control of the brake valve device at the front end of the train and for connecting said straight air pipe and said brake pipe of the train unit to the corresponding branch straight air and branch brake pipe of that unit, and the magnet valve device circuit conductors to the corresponding branch magnet valve device circuits of that unit for controlling the brakes from the brake valve device of that unit.

11. In a brake equipment for vehicles comprising a plurality of train units or sections having a front section, a rear section, and at least one intermediate section adapted to be operated as a unit, a brake pipe and a straight air pipe extending throughout the train, each train section having a local main reservoir, a brake cylinder and automatic valve means for controlling the supply of fluid under pressure to said brake cylinder in accordance with a reduction in brake pipe pressure, an application magnet valve device and a release magnet valve device for controlling the supply of fluid under pressure from the local main reservoir to the straight air pipe to control the brakes, control circuits for said magnet valve devices, each front and intermediate section having a brake valve device provided with a branch brake pipe and a branch straight air pipe and branch application and release magnet valve circuits, a control device on certain of said sections for connecting the straight air pipe, the brake air pipe, and the magnet valve circuits associated with the braking equipment of that section to the corresponding pipes and circuits of an adjoining section to be controlled by the brake valve device on the associated or adjoining section.

12. In a brake equipment for vehicles comprising a plurality of train sections adapted to be operated as separate train units, each train section comprising a brake pipe and means responsive to a reduction in brake pipe pressure for applying the brakes on that train section and a straight air pipe and means responsive to an increase in straight air pipe pressure for effecting an application of the brakes on that section, and at least one of the train sections having a brake valve device for controlling the pressure in said brake pipe and in said straight air pipe and transfer means on said section for effecting communication between the straight air pipe and the brake pipe of that section with the straight air pipe and the brake pipe of an adjoining section or for closing communication between the straight air pipe and the brake pipe of said section with the adjoining section and effecting communication between the straight air pipe and the brake pipe of said section with the brake valve device on said section.

13. In a brake equipment for vehicles comprising a plurality of train sections adapted to be operated as a unit train, braking means on each train section comprising a brake cylinder, straight air means for controlling the application and release of the brakes and automatic means for controlling the application and release of the brakes, a brake valve device in at least two train sections adapted to control straight air pipe pressure and brake pipe pressure for controlling the application and release of the brakes, and means in at least one of said sections for selectively rendering said brake valve device of that section operative to control the straight air pipe pressure and brake pipe pressure of that section or for transferring the control of the straight air pipe pressure and brake pipe pressure of that section to a brake valve device on another train section.

JOHN W. LOGAN, Jr.